(12) United States Patent
Freebairn et al.

(10) Patent No.: US 11,957,136 B2
(45) Date of Patent: Apr. 16, 2024

(54) CONNECTED FROZEN BEVERAGE MACHINE

(71) Applicant: Freezing Point LLC, Salt Lake City, UT (US)

(72) Inventors: Owen Kyle Freebairn, Salt Lake City, UT (US); Kyle Lemmon, Salt Lake City, UT (US); Adam Larsen, Salt Lake City, UT (US); Reid Langston, Salt Lake City, UT (US); Justin Allred, Salt Lake City, UT (US)

(73) Assignee: Freezing Point LLC, Salt Lake City, UT (US)

( * ) Notice: Subject to any disclaimer, the term of this patent is extended or adjusted under 35 U.S.C. 154(b) by 399 days.

(21) Appl. No.: 16/736,351

(22) Filed: Jan. 7, 2020

(65) Prior Publication Data

US 2020/0214316 A1 Jul. 9, 2020

Related U.S. Application Data

(60) Provisional application No. 62/789,484, filed on Jan. 7, 2019.

(51) Int. Cl.
*A23G 9/04* (2006.01)
*A23G 9/28* (2006.01)
*G01S 19/13* (2010.01)
*H04Q 9/02* (2006.01)

(52) U.S. Cl.
CPC ............. *A23G 9/045* (2013.01); *A23G 9/28* (2013.01); *H04Q 9/02* (2013.01); *G01S 19/13* (2013.01); *H04Q 2209/10* (2013.01); *H04Q 2209/82* (2013.01)

(58) Field of Classification Search
None
See application file for complete search history.

(56) References Cited

U.S. PATENT DOCUMENTS

| | | | |
|---|---|---|---|
| 6,934,862 B2 | 8/2005 | Sharood et al. |
| 8,245,739 B1 | 8/2012 | Wade et al. |
| 8,459,497 B2 | 6/2013 | Milan et al. |
| 8,549,131 B2 | 10/2013 | Keyghobad et al. |

(Continued)

OTHER PUBLICATIONS

Davis, LG Smart ThinQ sensor sparks retrofit potential for home appliances; https://rethinkresearch.biz/articles/lg-smart-thing-sensor-sparks-retrofit-potential-for-home-appliances/, Sept. 4, 2015.

*Primary Examiner* — Thomas S McCormack
(74) *Attorney, Agent, or Firm* — Thorpe North & Western, LLP; Peter M. de Jonge; Kurt Hendricks

(57) ABSTRACT

A connected frozen beverage machine is disclosed including a beverage dispenser with at least one hopper and a cooling system, a plurality of sensors adapted to produce a plurality of signals, and a retrofit module with a receiver for the plurality of signals and a communication component for sending the plurality of signals to a central system. The connected frozen beverage machine can be deployed as part of a system of machines. The system can estimate the amount of product throughput for each machine based on signals from the plurality of sensors. The amount of product throughput can be compared to the amount of authorized product provided for each machine to determine whether unauthorized product is being used.

19 Claims, 20 Drawing Sheets

(56) References Cited

U.S. PATENT DOCUMENTS

| | | |
|---|---|---|
| 10,012,971 B2 | 7/2018 | Pietsch et al. |
| 10,111,070 B2 | 10/2018 | Zakaria et al. |
| 2005/0087255 A1 | 4/2005 | Humphrey et al. |
| 2008/0092571 A1 | 4/2008 | Allison et al. |
| 2012/0223094 A1 | 9/2012 | Rickard, Jr. et al. |
| 2018/0007453 A1* | 1/2018 | Taylor ................ H04Q 9/00 |
| 2018/0096554 A1* | 4/2018 | Hough ................ G07F 9/026 |
| 2018/0270076 A1 | 9/2018 | Natarajan et al. |
| 2019/0166874 A1* | 6/2019 | Douer ................ A23G 9/28 |

* cited by examiner

FIG. 14

CONNECTED FROZEN BEVERAGE MACHINE

FIELD OF THE TECHNOLOGY

The field of the invention relates generally to internet-connected food service equipment, and more specifically to retrofitting existing frozen beverage machines with internet-connected sensors as part of a system for monitoring status of the machines.

BACKGROUND OF THE TECHNOLOGY AND RELATED ART

Food service equipment, such as frozen beverage machines or dispensers, are most often installed for operation in locations that are remote from an owner or manager having an interest in the performance and maintenance of a machine. In many situations, food service equipment is deployed as part of a network of stores or locations under common ownership or management, which can lead to large numbers of machines operated remotely from the owner or manager. Though developments with connected devices, often known as the Internet of Things, has led to advancements in commercial and individual use of devices connected to the internet, there remains a need for machines and systems for remotely monitoring, gathering information on, and generating reminders and action items for the food service equipment industry.

BRIEF DESCRIPTION OF THE DRAWINGS

The present technology will become more fully apparent from the following description and appended claims, taken in conjunction with the accompanying drawings. Understanding that these drawings merely depict exemplary aspects of the present technology they are, therefore, not to be considered limiting of its scope. It will be readily appreciated that the components of the present technology, as generally described and illustrated in the figures herein, could be arranged and designed in a wide variety of different configurations. Nonetheless, the technology will be described and explained with additional specificity and detail through the use of the accompanying drawings in which:

FIGS. 2-16 are screenshots of an example dashboard for viewing information from the system of FIG. 1;

DETAILED DESCRIPTION

Figure 1:
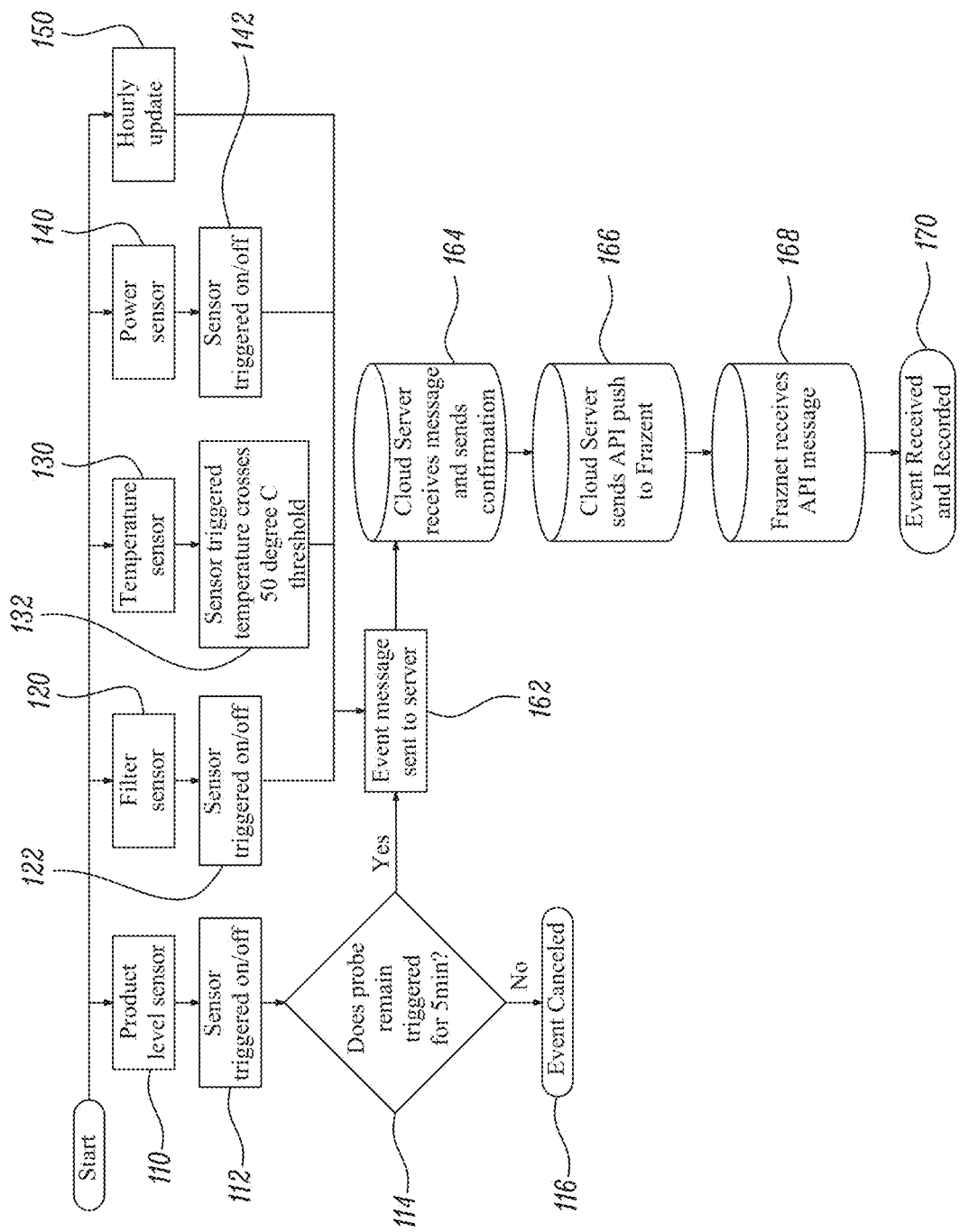
FIG. 1 is flow chart depicting a remote food service equipment monitoring system according to aspects of the present technology.

The following detailed description includes reference to the accompanying drawings, which form a part hereof and in which are shown, by way of illustration, exemplary embodiments. It is believed that an add-on, retrofit module for converting food service equipment such as frozen beverage machines or dispensers into connected machines will create an advantageous system for remote monitoring of the use of such machines. However, before the present technology is disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Although the following detailed description contains many specifics for the purpose of illustration, a person of ordinary skill in the art will appreciate that many variations and alterations to the following details can be made and are considered to be included herein. Accordingly, the following embodiments are set forth without any loss of generality to, and without imposing limitations upon, any claims set forth. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a line" includes a plurality of such lines.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," in this specification it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

Objects described herein as being "adjacent to" each other may be in physical contact with each other, in close proximity to each other, or in the same general region or area as each other, as appropriate for the context in which the phrase is used.

Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 angstroms to about 80 angstroms" should also be understood to provide support for the range of "50 angstroms to 80 angstroms."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.8, 3, 3.1, 4, 4.6, and 5, individually.

This same principle applies to ranges reciting only one numerical value as a minimum or a maximum. Furthermore, such an interpretation should apply regardless of the breadth of the range or the characteristics being described.

As used herein, "enhanced," "improved," "performance-enhanced," "upgraded," "improvement," and the like, when used in connection with the description of a device, component, or process, refers to a characteristic of the device, component or process that provides measurably better form, function, or outcome as compared to previously known devices or processes. This applies both to the form and function of individual components in a device or process, as well as to such devices or processes as a whole.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

Example Embodiments

It should be understood that the aspects of the technology discussed herein are contemplated for use with any type of food service equipment. For purposes of illustrating the various aspects of the methods and systems claimed herein, the discussion below will be primarily directed to describing exemplary embodiments directed to frozen beverage machines or dispensers. It should be noted, however, that the elements and principles discussed herein are applicable to other applications. It is also noted that discussion of methods and systems herein can be interchangeable with respect to specific aspects. In other words, specific discussion of one method or system (or components thereof) herein is equally applicable to other aspects as they relate to the system or method, and vice versa.

Aspects of the technology provide for a connected frozen beverage machine that includes a beverage dispenser having at least one hopper and a cooling system. The frozen beverage dispenser also includes a plurality of sensors adapted to produce a plurality of signals when the sensors are triggered. The signals from the sensors may include one or more of a power signal when power to the machine is on or off, a low product signal when a product in the hopper is below a specified level, and cooling sensor when the cooling system is running. In aspects of the present technology, the frozen beverage dispenser may be modified by adding a retrofit component, module or board that may include a receiver for the plurality of signals and a communication component or module for sending the plurality of signals to a central system. The central system monitors the plurality of signals and generates alerts based on the plurality of signals, as discussed herein.

In some aspects of the present technology, the food service equipment may already include one or more sensors and the addition of the retrofit component may tap into the existing sensors. In other aspects of the technology, the retrofit component may include add-on sensors. For example, a machine may already include a temperature sensor for the cooling system, either separately or as part of a main logic system for the machine. In such examples, the retrofit module of the present technology may tap into the existing sensor to provide the temperature data. In other examples, a separate temperature sensor may be installed on a portion of the cooling system as part of the retrofit process. In other aspects of the technology, a combination of existing and add-on sensors may be used by the retrofit module, as described herein.

Modifying existing frozen beverage machines with an add-on retrofit provides distinct advantages over other alternatives. Food service equipment networks may include hundreds or thousands of existing machines that are not equipped with internet connectivity. Replacing all such machines with new machines having connectivity components may be cost prohibitive. Moreover, providing internet connectivity by modifying existing machines at central components, such as the mother board, may be expensive, require extensive skill and knowledge of electronics and the system, and may at times void the warranty of the machine. Providing an add-on, retrofit kit is a cost-effective and easily implemented solution. The retrofit kit may be used to tap into or take advantage of existing sensors on the machine, for example by piggy-backing off of existing sensor leads. In other embodiments, the retrofit kit may include the installation of new sensors at various points in the machine.

In one example of the present technology, the frozen beverage dispenser may have a cooling system that includes a compressor, a filter and a hot gas line. When the compressor is running to activate the cooling system, the temperature of the hot gas line may increase. A sensor on the hot gas line may thus either be installed, or if existing may be tapped into or piggy-backed on top of, to provide a signal when the cooling system is running. In one aspect of the technology, it is understood that the cooling system for frozen beverage dispensers undergoes various cycles. For example, when new product is added to the machine, the cooling system may run for an extended period of time to chill the new product to the desired temperature. Thereafter, the cooling system may run for short cycles to maintain the temperature of the product. The number of maintenance cycles may depend on the amount of product dispensed, as well as various environmental factors.

As the signals from the hot gas line are sent to the central system, the central system may compile the data to determine the throughput of product for a particular machine. For example, an algorithm may be used to calculate each time new product is added to the machine based on the cooling system cycles and relevant environmental factors. The product throughput can then be estimated based on product low sensors and a calculation of cycles of new product added. In one aspect of the system of the present technology, a product manufacturer may own the machine and lease the machine to an operator based on an agreement that the operator use only authorized product purchased from the product manufacturer. There would thus be distinct advantages to monitoring the amount of actual product throughput for each machine. If the product throughput calculated from the cooling system cycles is greater than the authorized product sold for a particular machine, it may be an indication that unauthorized product is being used in the machine.

As an example of how the system may be used to monitor throughput of product, the system may include a machine leased to Store A with five cases of authorized product sold to Store A. The system may determine that the hot gas line sensor is triggered, or in other words the gas line is hot because the compressor is running, for 15 minutes to bring new product added to the machine to the desired temperature. Thereafter, under normal operating conditions, it may be determined that the hot gas line sensor is triggered for 2 minutes every half hour to maintain the temperature of the frozen beverage. On a normal, 24 hour operating day, the machine of Store A may be refilled three times, at approximately eight hour intervals, with the hot gas line sensor triggered for 15 minutes during each refill. When the hot gas line sensor data is received at the central system, it may be calculated based on the size of the hopper and the cycle of the cooling system of the frozen beverage machine that Store A used approximately ten cases of product in one month. The central system may then compare this approximate throughput based on sensor data to the actual distributor data showing that Store A purchased five cases of authorized product. An alert may be triggered when the difference between the actual distributor data and the approximate throughput reaches a certain level. Based on the alert, the owner of the machine and manufacturer of the authorized product may approach Store A regarding the discrepancy to determine if Store A is using an unauthorized product in the machine. In this way, the system of the present technology may be used to monitor authorized product throughput of the connected machines of the system.

According to aspects of the present technology, the system may employ a plurality of sensors on a one or more beverage dispensing machines. At least one of the plurality of signals may be used to estimate the amount of a product being dispensed by the beverage dispenser. The estimation of product being dispensed may rely on any one of the sensors, as discussed herein. For example, the product low sensor may be used to estimate the number of units of product that have been dispensed by the beverage dispenser. Each time the product low sensor is triggered, the system may account for one cycle of product. Based on the number of times the low sensor has been triggered over a given period, the amount of product that would be cycled through the beverage dispenser may be calculated to estimate the number of units of product dispensed.

In another example, the cooling cycles of the beverage dispenser, as gathered from a temperature sensor connected to a portion of the cooling system, may be used to calculate the number of times new product has been added to the machine. New product requires a certain cooling process that may be traceable through the cycles of the cooling system. Accordingly, the number of times the cooling system sensor is triggered, and the duration of time for each trigger, may be used to calculate the number of cycles of the cooling system. The quantity of product used by the machine can then be derived from the number of cycles of the cooling system.

Once the system has estimated the number of units of product dispensed by a certain machine, the system amount of the product being dispensed is compared to the amount of authorized product provided to the operator of the particular machine. By comparing the authorized product provided to estimated product dispensed, the owner of the machine and system may determine if unauthorized product is being dispensed by the machine. For example, Store B has three beverage dispensing machines as part of a system of beverage dispensing machines owned by Owner A. Store B agrees to only purchase and dispense authorized product from Owner A in the three machines. Owner A retrofits the three machines as described herein and estimates the amount of product being dispensed by the three machines. Owner A compares the estimated amount of product to the quantity of authorized product actually sold to Store B. If the three machines of Store B are estimated to have dispensed more product than Owner A sold to Store B, Owner A may approach Store B to determine if unauthorized product is being dispensed from the three machines in Store B.

Said another way, the present technology provides for a system and method for verifying that authorized product is being dispensed by a system of food service machines. The owner of a system of food service machines may save time and resources by monitoring the food service machines from a central location. While previously the owner of such a network may need to employ individuals to make on site visits to verify certain aspects of the food service machines deployed at different locations, the system and method of the present disclosure provide an improved solution. Particularly with respect to the checks and balances on use of authorized material, the present technology provides distinct advantages not found in the industry.

According to other aspects of the present technology, the frozen beverage dispenser may include a filter that must be removed and cleaned at certain intervals to maintain optimal performance of the machine and prevent degradation of the components or other maintenance or repair that may be avoidable. In one aspect of the technology, as part of the retrofit add-on to the machine, a pressure sensor may be installed at the filter to create a signal each time the filter is removed. If the filter is not removed for cleaning for longer than a specified time, such as 30 days, an alert may be triggered. The alert may include an automated message to the specified contact at the location of the machine indicating that the filter needs to be cleaned.

In other aspects of the technology, the system may be designed to receive a product low signal when the product in the hopper falls below a specified level for longer than a specified time. When the product falls below certain levels in frozen beverage machines, the quality of the product and the well-being of the machine may be negatively impacted. Moreover, low product for extended periods of time may be an indicator that the machine is not being well utilized by the store, or that an effort is not being made to sell more product. In one example, if product in the hopper of a frozen beverage dispenser stays below the level of a sensor for more than eight hours, an alert may be created by the system.

In each example discussed herein, the system of the present disclosure may maintain a history of signals received, which may be presented for individual stores or grouped by region, store ownership or management, or any other variable, to form reports of historical data. The reports of historical data may be useful for the owner of the machine, the manufacturer and distributors of authorized product, and the owners and operators of store locations to understand trends and make adjustments as needed.

In aspects of the present disclosure, the retrofit module may be a retrofit board. The retrofit board may include a global positioning system module (GPS). The GPS module may send a signal when the machine is moved more than a set distance, or may send a last-known location signal when power is switched off to the machine. Moreover, the GPS module may be used to triangulate the location of the machine using cell towers and other known methods for locating a device.

According to the present technology, the retrofit board may be designed, adapted and configured to fit securely within an existing housing or housings of the machine. In one aspect, the retrofit board may be a layered PCB with individual connections leading to each sensor of the machine. In other embodiments, a single connector may be used to link the PCB to the sensors. In yet other embodiments, the retrofit component may be an enclosed component with only the sensor connector exposed. The retrofit board, whether with an enclosure or not, may be sized and shaped to fit in a channel or opening that is predisposed on the frozen beverage machine. In one example, the retrofit board slides into a channel that is disposed behind or underneath housing, such that no modification to the physical aspects of the existing machine are necessary.

As will be understood from the above description, the present technology relates to a food service equipment remote monitoring system. The system may include a plurality of food service equipment products, each including a plurality of sensors adapted to produce a plurality of signals. As discussed above, the signals may include power on and off, temperature of cooling system, product level below a threshold, and filter installed or removed. The system may include a retrofit module installed in each of the plurality of food service equipment products, the retrofit module including a receiver for the plurality of signals and a communication module for sending the plurality of signals to a central system. As discussed herein, the central system is adapted and configured to receive the plurality of signals and generate alerts based on the signals.

In one aspect of the system, the plurality of food service equipment products are frozen beverage dispensers each including at least one hopper and a cooling system. The central system may be adapted and configured to calculate the product throughput of a frozen beverage dispenser at a certain location based on the signals from the cooling system. The system may then compare the throughput to quantities of authorized product sold at the location to verify that only authorized product is being used in the frozen beverage dispenser.

It will be understood that the present technology also relates to a method for retrofitting and remotely monitoring food service equipment. The method may include providing a plurality of food service equipment products, each including a plurality of sensors adapted to produce a plurality of signals. The method may also include installing a retrofit module in each of the plurality of food service equipment products, the retrofit module having a receiver for the plurality of signals and a communication module for sending the plurality of signals to a central system. The method further includes receiving the plurality of signals at the central system and calculating the quantity of product throughput for each of the plurality of food service equipment products. The method then includes comparing the calculated quantity of product throughput to the quantity of authorized product sold to verify that only authorized product is being used in the food service equipment products. Other aspects of the present disclosure will be understood to modify or expand the methods related to food service equipment, Now with reference to the accompanying drawings, FIG. 1 depicts a flow chart for a system according to the present technology. The system may include a plurality of sensors, including a product level sensor 110, a filter sensor 120, a temperature sensor 130, and a power sensor 140. When a sensor is triggered, an event message may be sent to a server 162. For example, the product level sensor may be triggered on or off 112. In some instances, the event may not be sent until the sensor remains triggered for a set period of time, such as five minutes. For example, the system may determine if the probe or sensor remains triggered for five minutes at 114. If the probe remains triggered, an event message may be sent to a server at 162. If the probe or sensor does not remain triggered for five minutes, the event may be cancelled at 116.

Other examples of a sensor being triggered include if the filter sensor 120 is triggered on or off at 122. In one aspect of the technology, the filter sensor may include a sensor that is off when the filter is properly installed in a machine, but triggered on at 122 when the filter is removed from the machine. An event message may then be sent to the signal that the filter was removed. Similarly, the temperature sensor 130 may be triggered if the temperature of a certain component on which the sensor is installed crosses a threshold. For example, the temperatures sensor 130 may be disposed on a component of the cooling system of machine, and the sensor is triggered if the temperature rises above 50 degrees Celsius at 132. If the sensor is triggered, an event message is again sent to the server at 162. Another example includes the power sensor 140 being triggered on or off at 142. For example, if the power sensor is triggered off at 142, an event message may be sent to the server at 162. In some examples, the system includes an hourly update 150 of the triggered sensors, but other intervals of time may also be used.

When an event message is sent to the server 162, the server receives the message and sends confirmation 164. The server then may push the event to the system at 166, which may receive a message, such as an API message at 168. The system then records the event at 170. After recording the event, the system may display the event on the dashboard, trigger various alerts to be sent to system owners or store owners where the machine is installed, or perform other reporting and maintenance functions.

Figure 2:
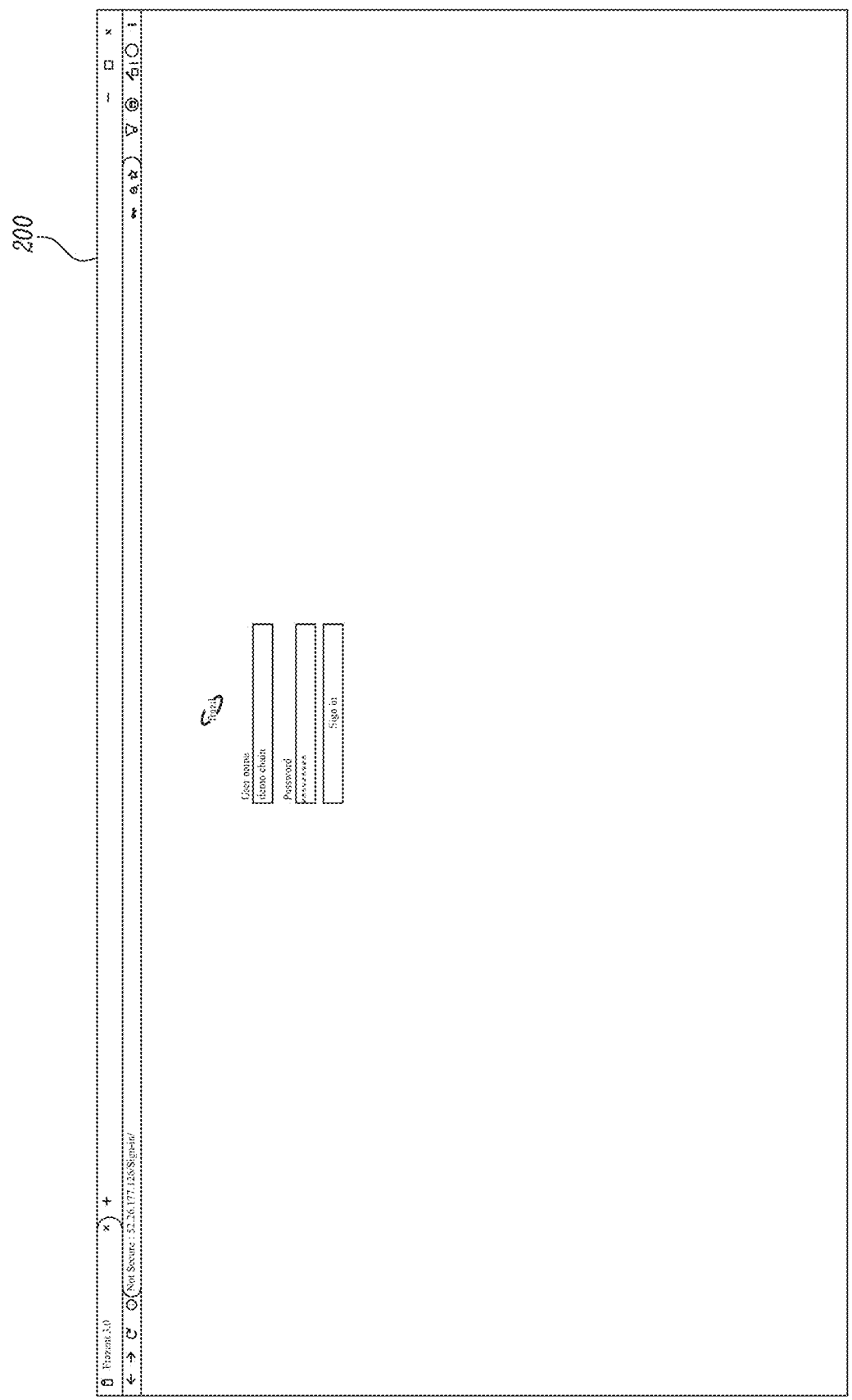
Figure 3:
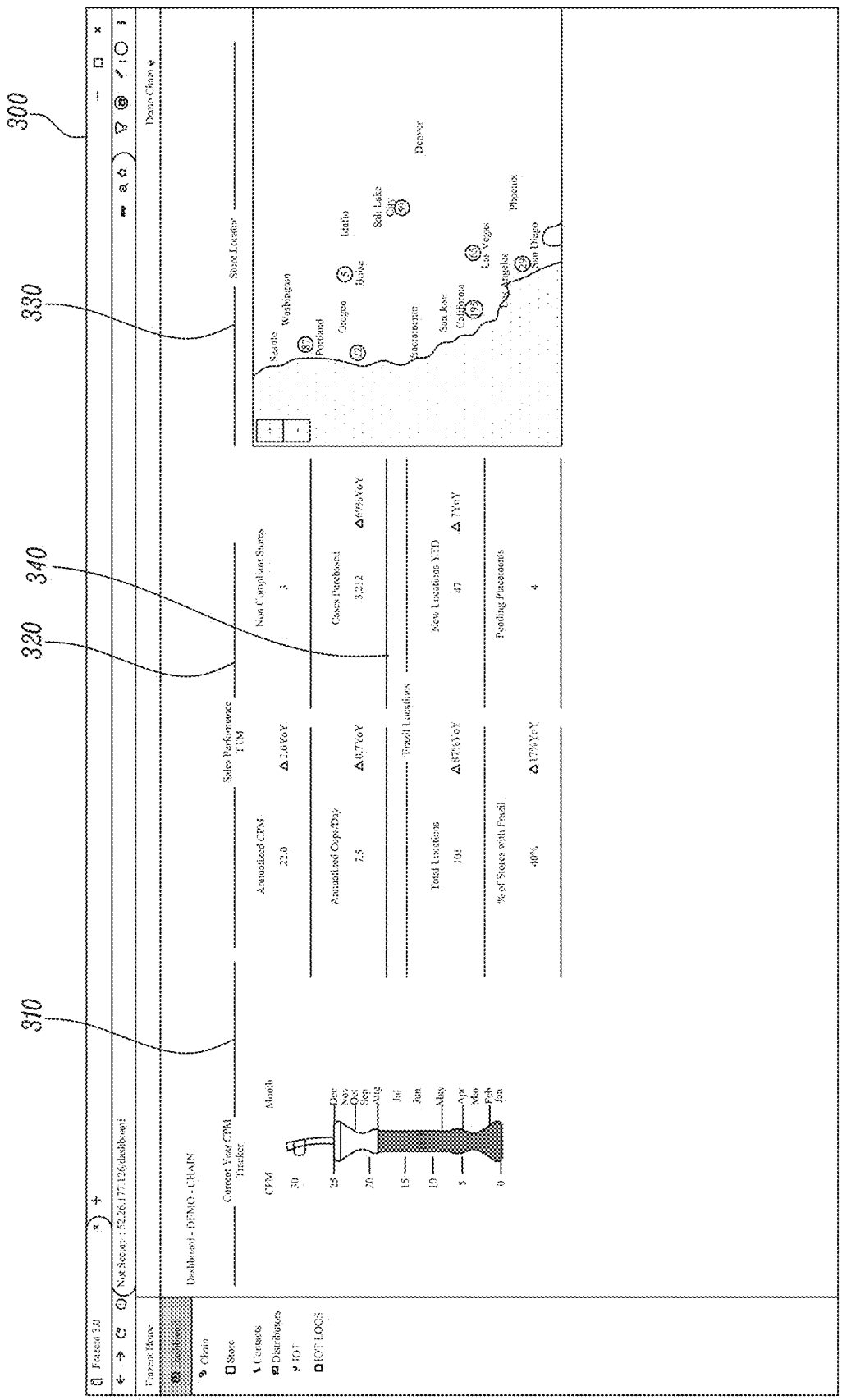

FIGS. 2-16 show examples of a dashboard of a central system for monitoring conditions of a connected frozen beverage machine. FIG. 2 shows a login page 200. FIG. 3 shows a dashboard home page 300 including a current year tracker of product 310, sales performance indicators 320, a location map 330, and location indicators 340.

Figure 4:
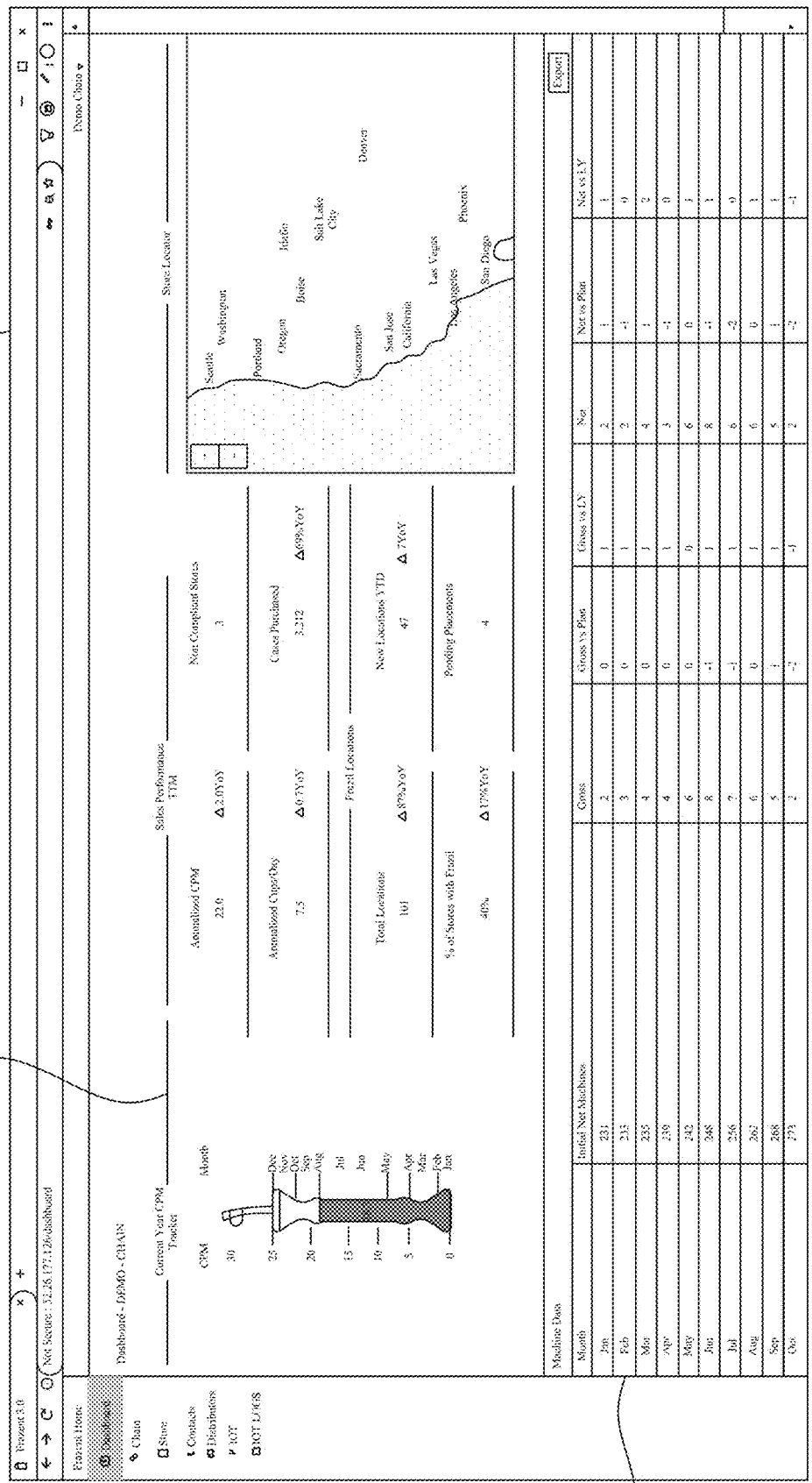
Figure 5:
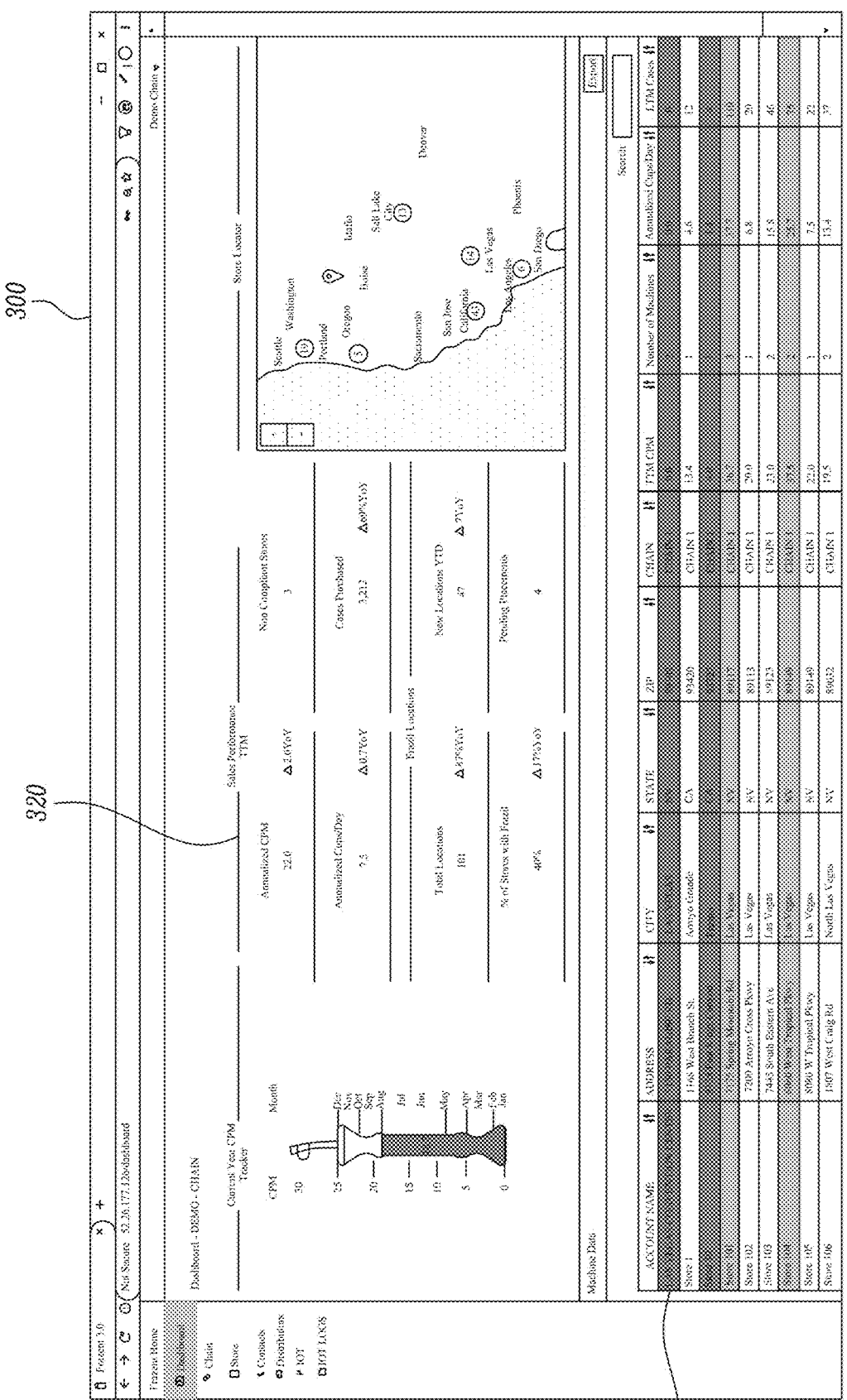
Figure 6:
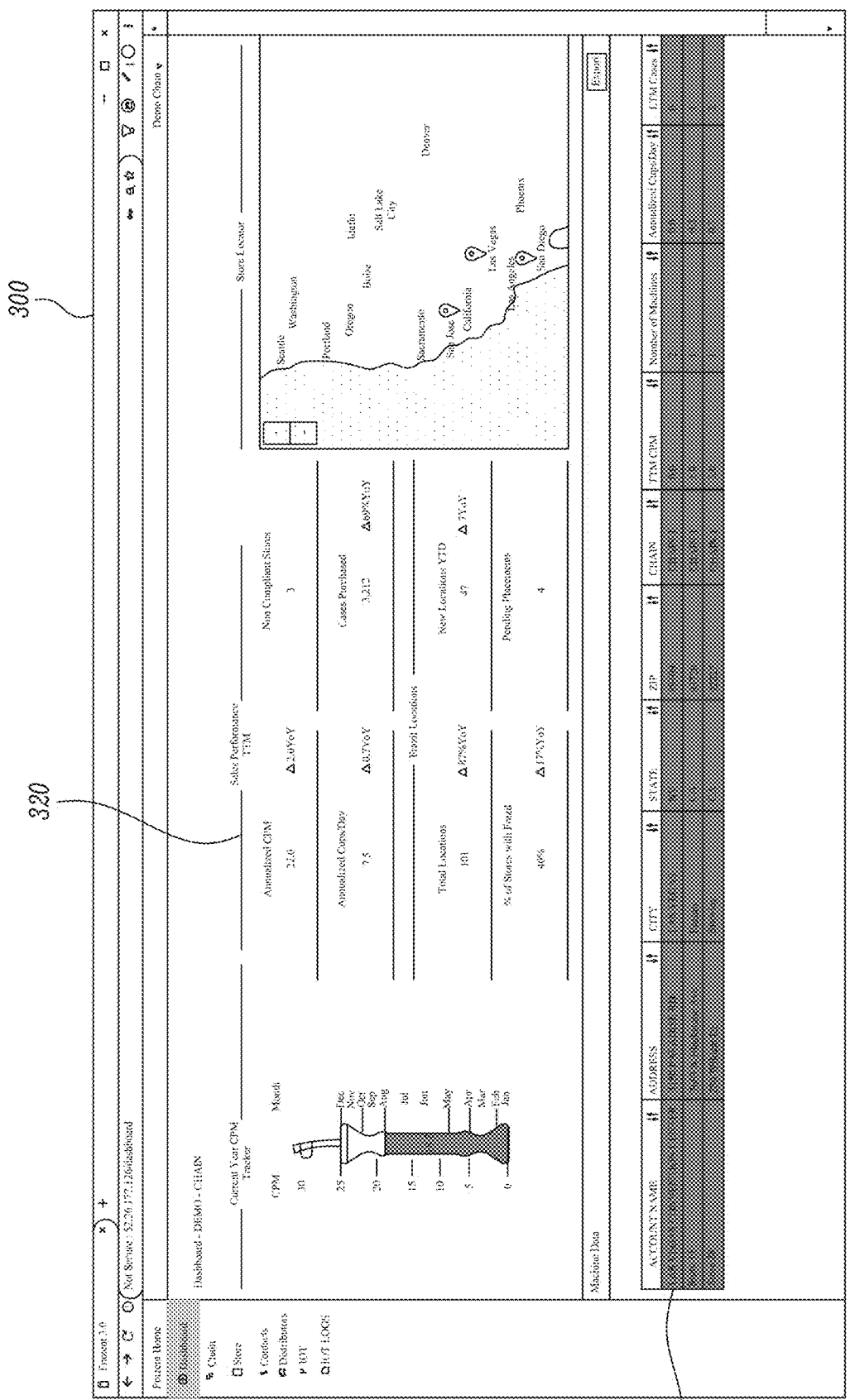
Figure 7:
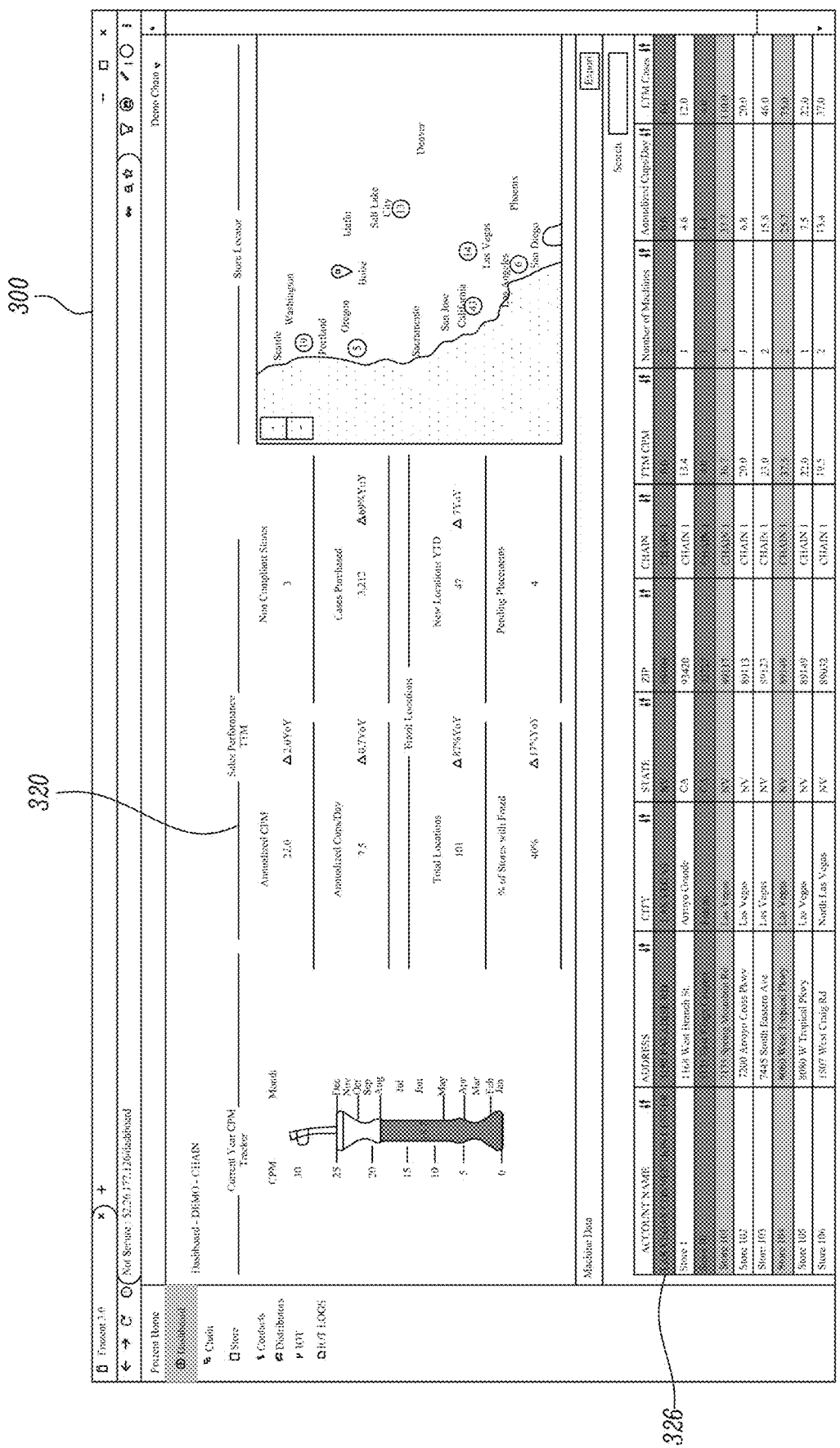
Figure 8:
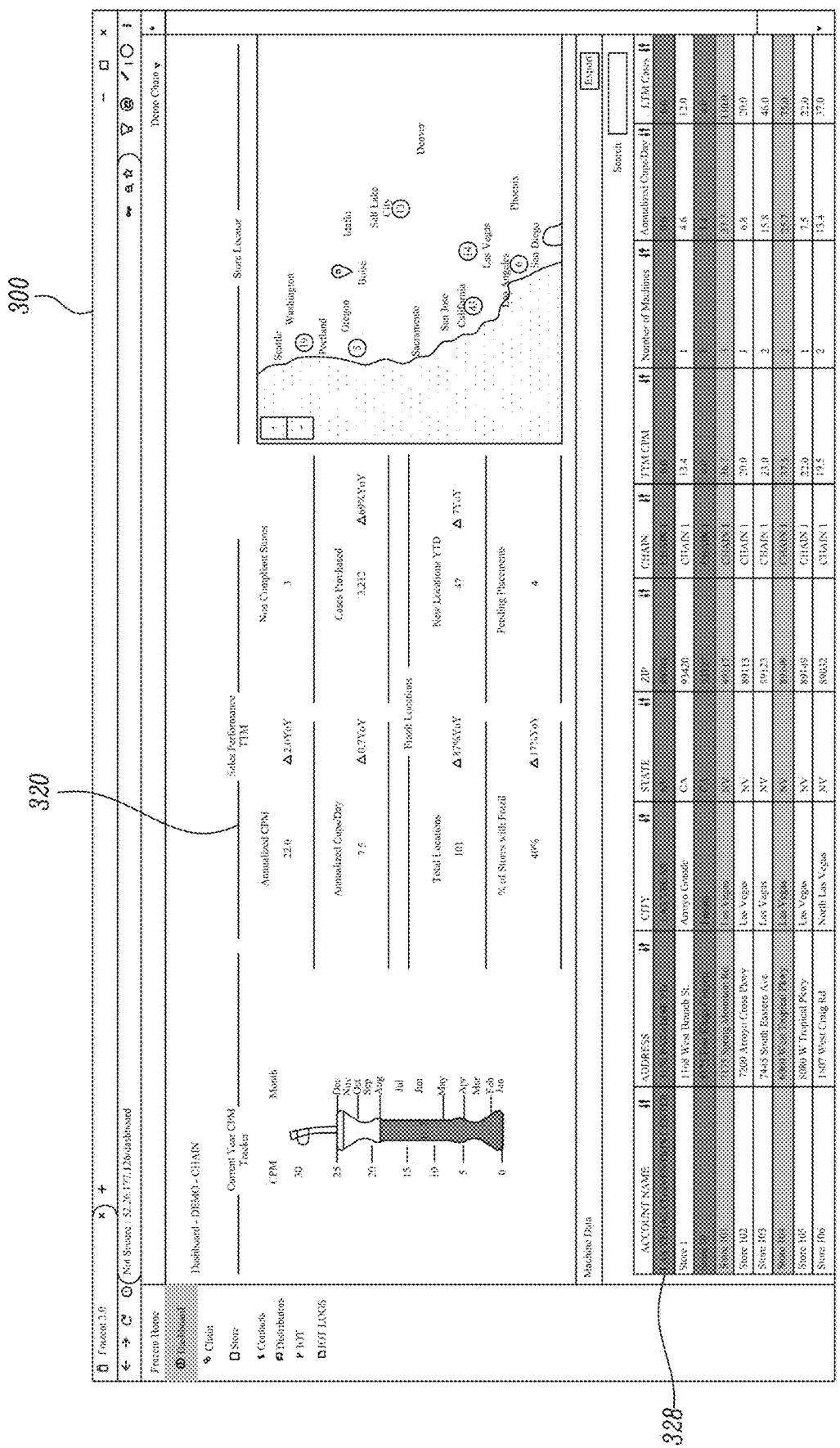

FIG. 4 depicts selection of the current year cases per machine (CPM) 310 on the dashboard 300 and display of machine data for each month of the year 312. FIG. 5 depicts annualized CPM in the sales performance indicators 320, with a breakdown of machine data by account or store 322 displayed in detail. The breakdown of machine data 322 may be color coded, for example, to show those values above a target value in blue, those that are nearing the low end of target value in yellow, and those that are below a target value in red. FIG. 6 depicts selection of non-compliant stores from the sales performance indicators 320 on dashboard 300 to display details on non-compliant stores 324. FIG. 7 shows selection of annualized cups per day from the sales performance indicators 320 of dashboard 300 and display of the breakdown of data for annualized cups per day 326. The breakdown 326 may again be color coded, as discussed herein with reference to FIG. 5. FIG. 8 shows cases purchased selected from the sales performance indicators 320, both with machine data by account or store location also shown in detailed breakdown 328.

Figure 9:
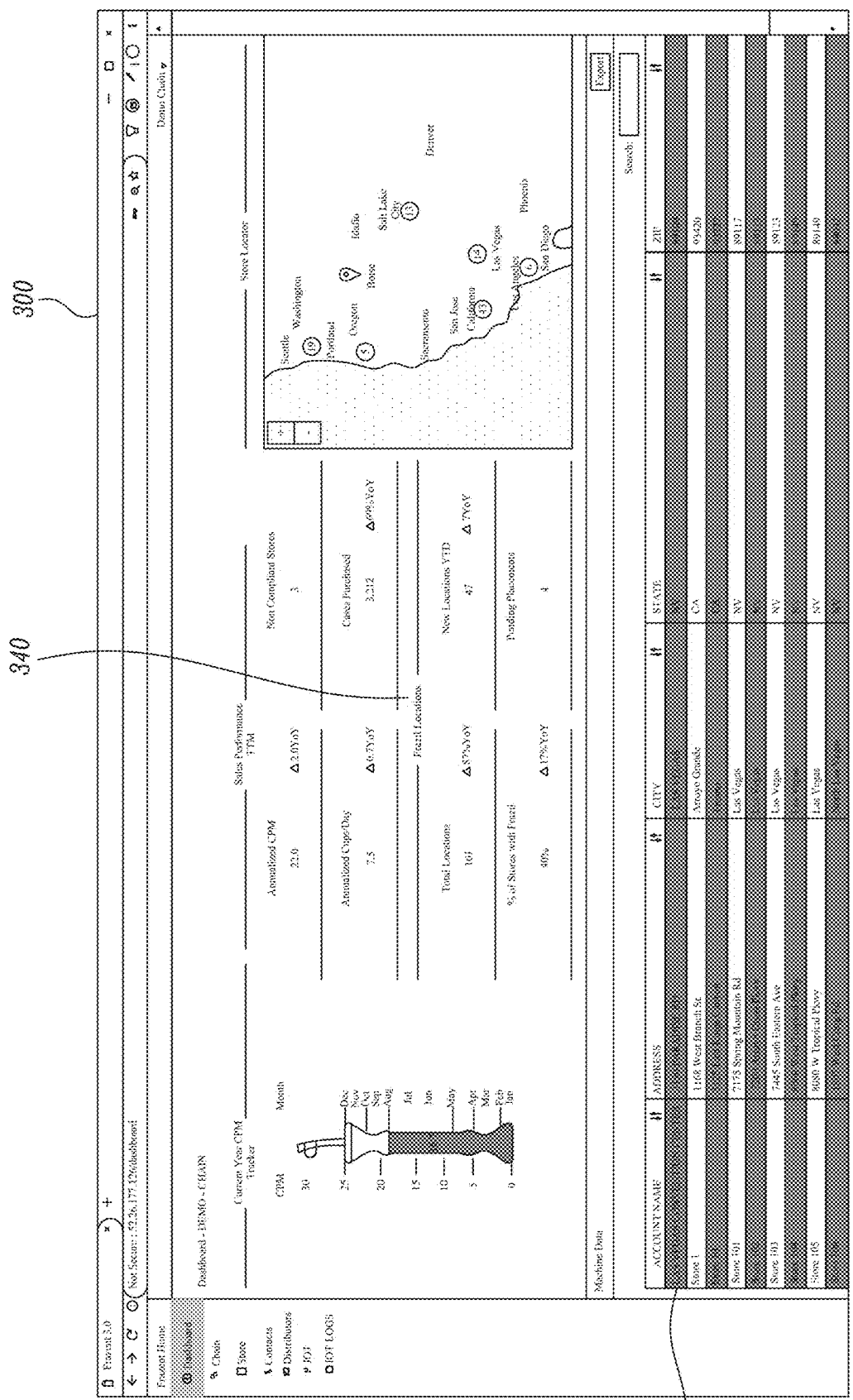
Figure 10:
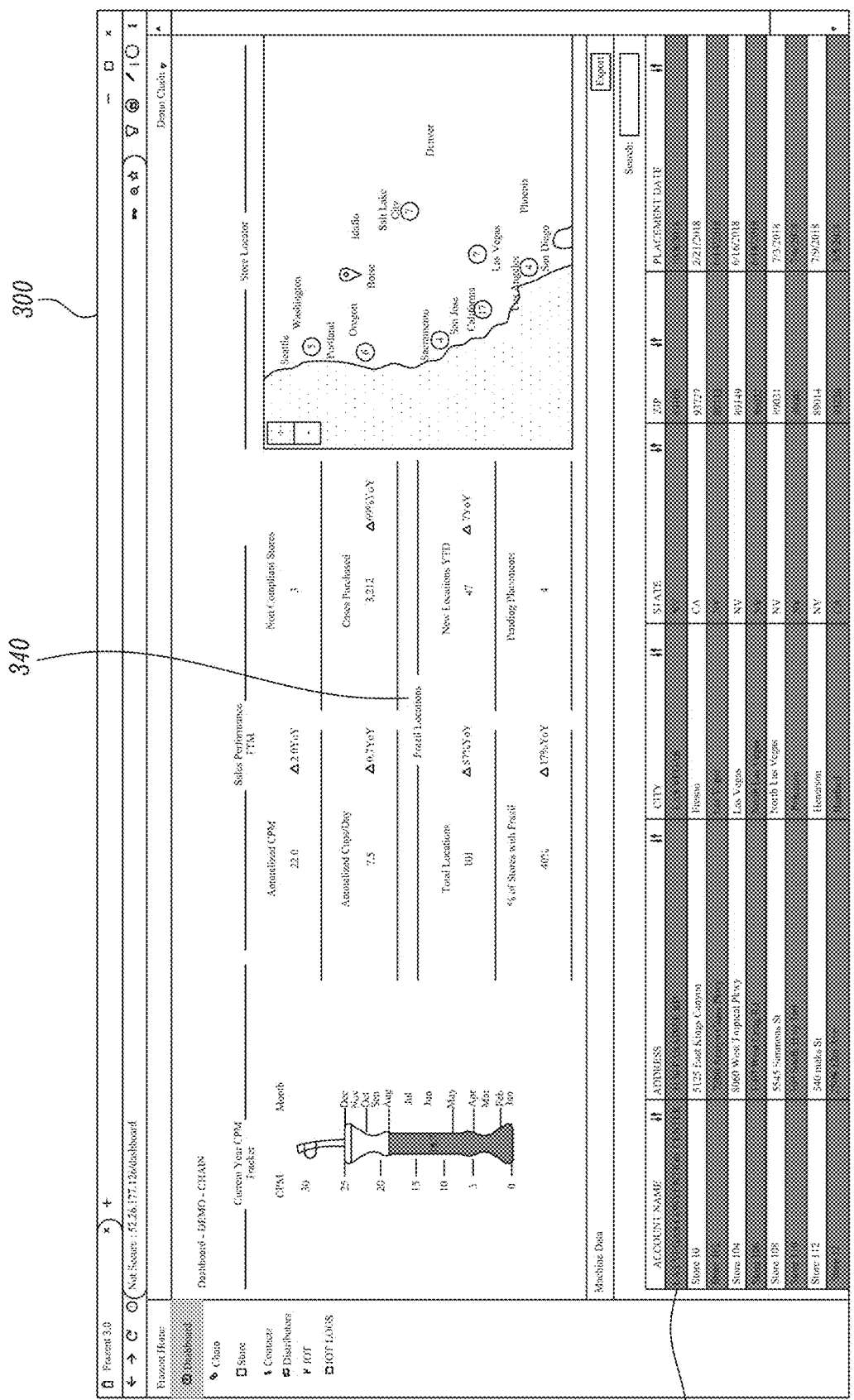
Figure 11:
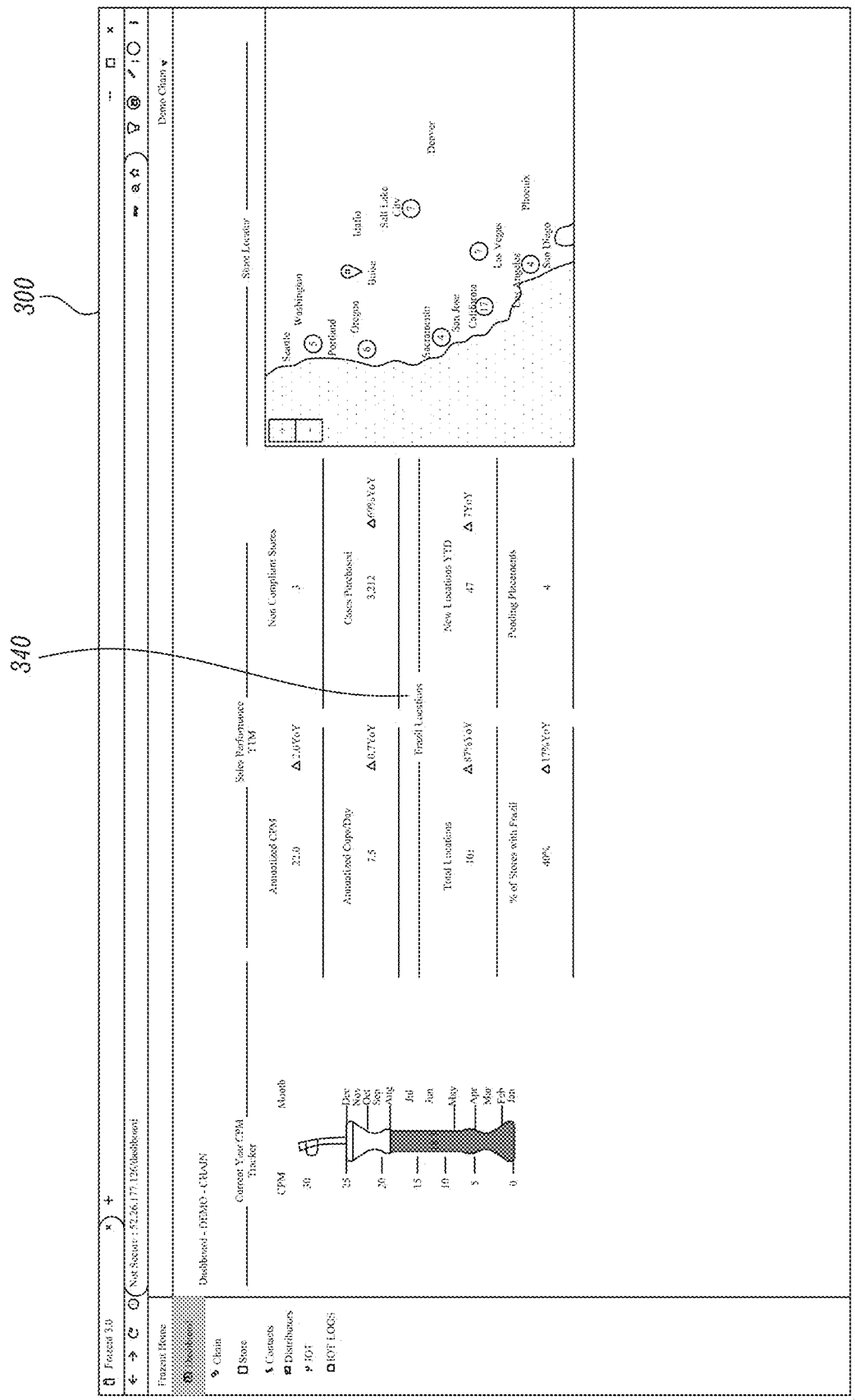
Figure 12:
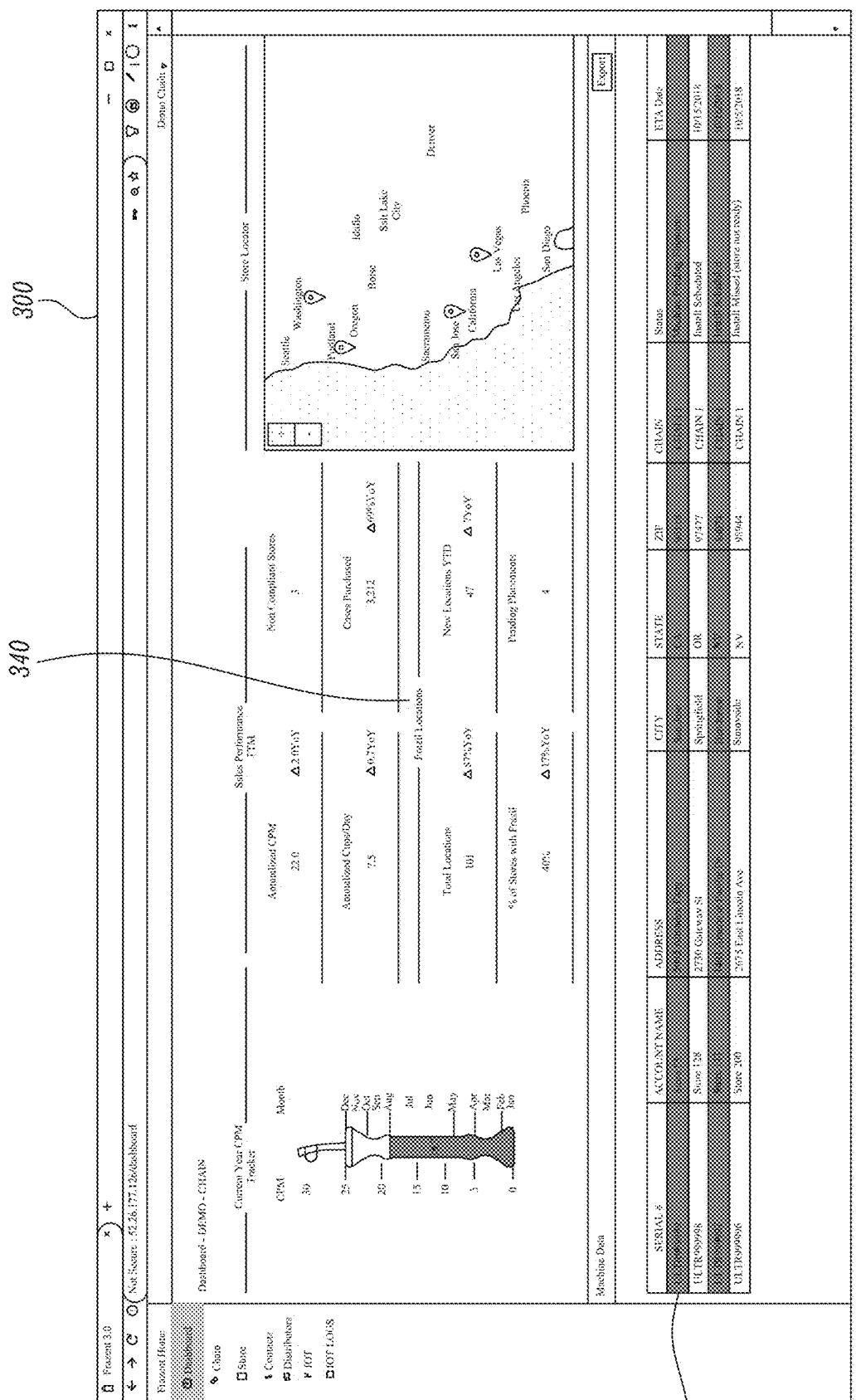

FIG. 9 shows selection of total locations from locations indicator 340 on dashboard 300, with detailed display of store locations 324. FIG. 10 shows selection of new locations for a year to date from locations indicators 340 of dashboard 300, with detailed corresponding store machine data 344 displayed below the dashboard. FIG. 11 shows selection of the percentage of stores with a machine installed from the locations indicators 340 of dashboard 300, while FIG. 12 depicts selection of the stores where placement of a machine is pending from the locations indicators 340 of dashboard 300, with details on pending placements 346 displayed on dashboard 300. In each of the examples given to this point, a map 330 on the dashboard may display locations of stores to visualize the selected data.

Figure 13:
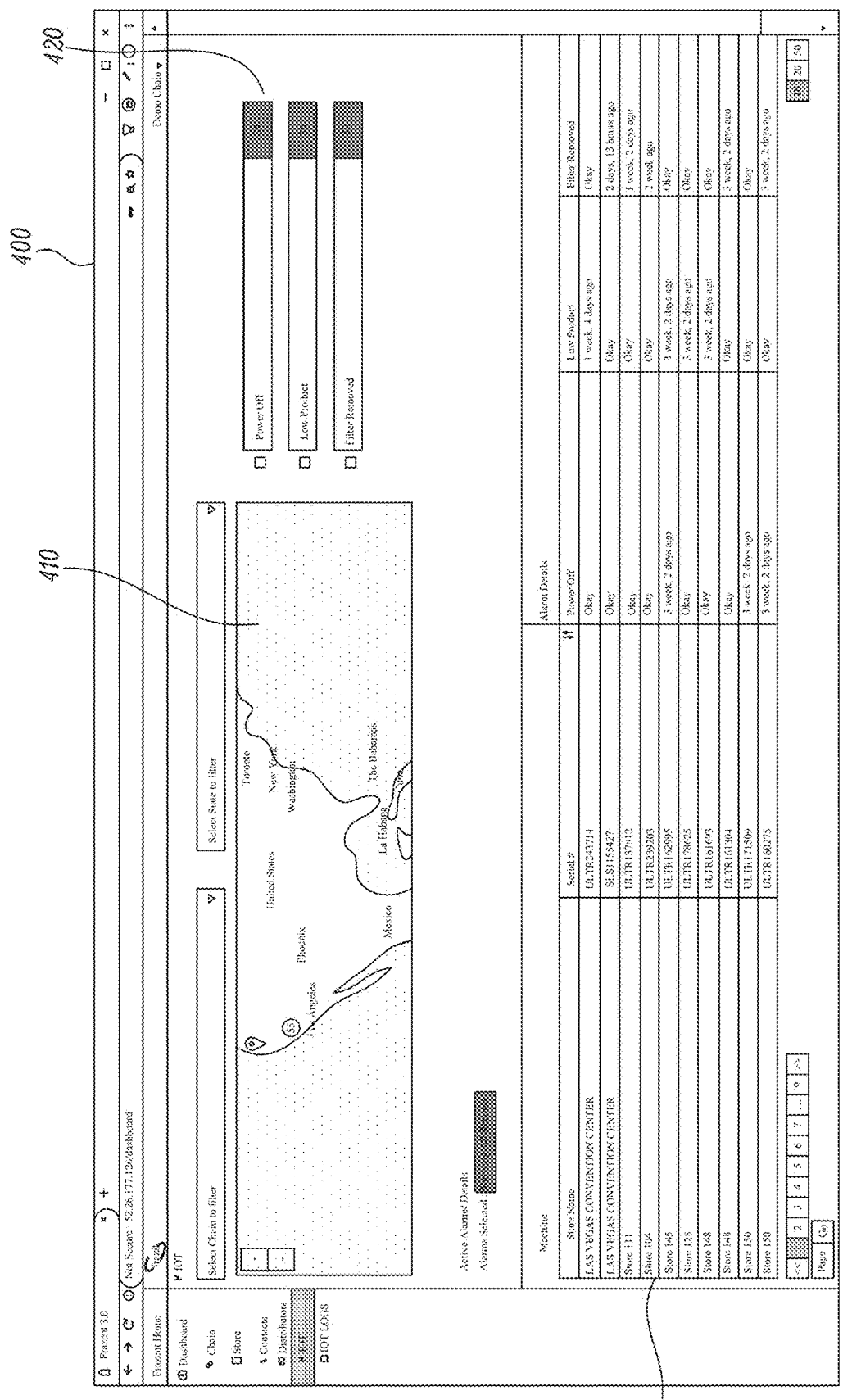
Figure 14:
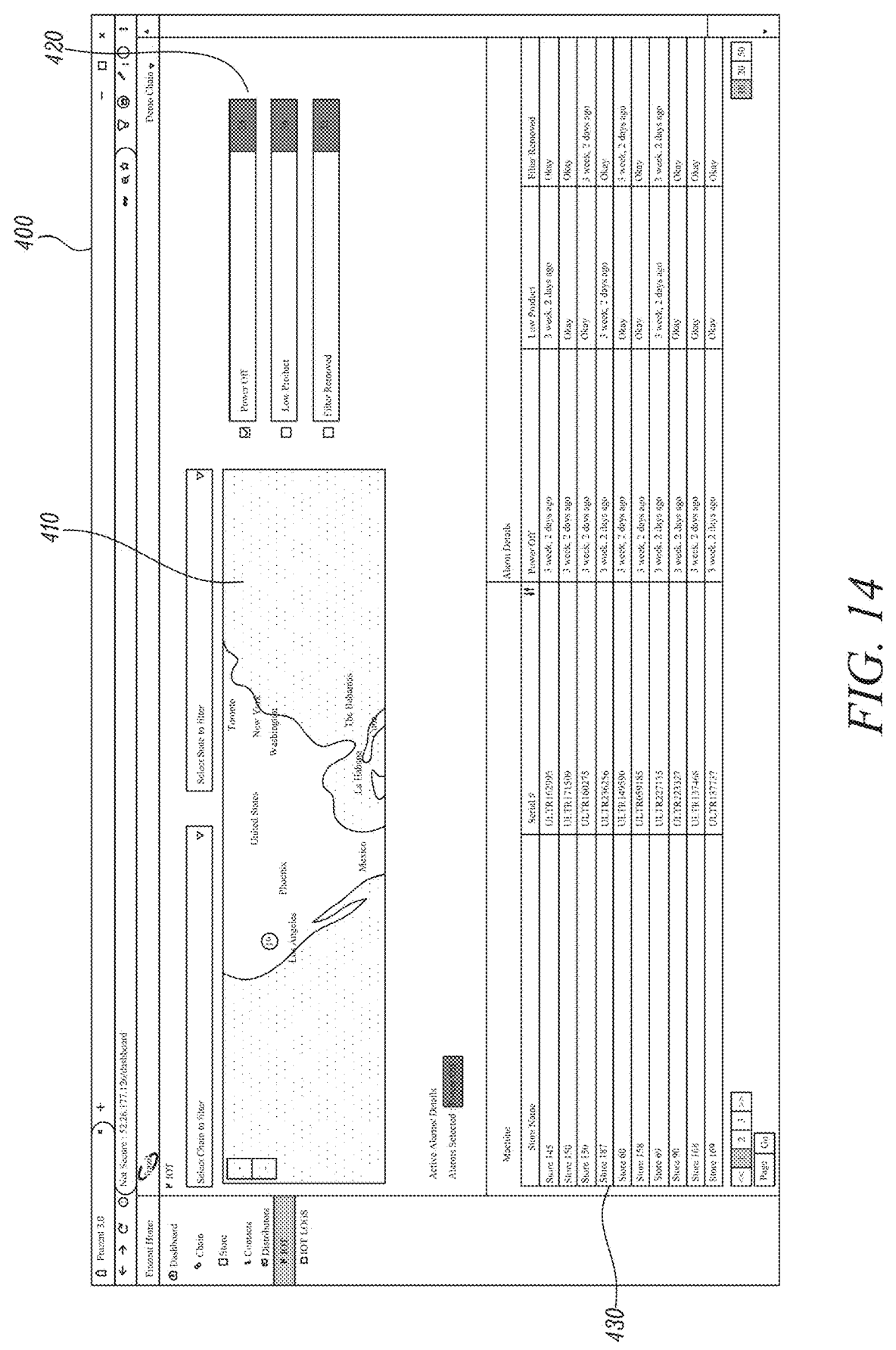
Figure 15:
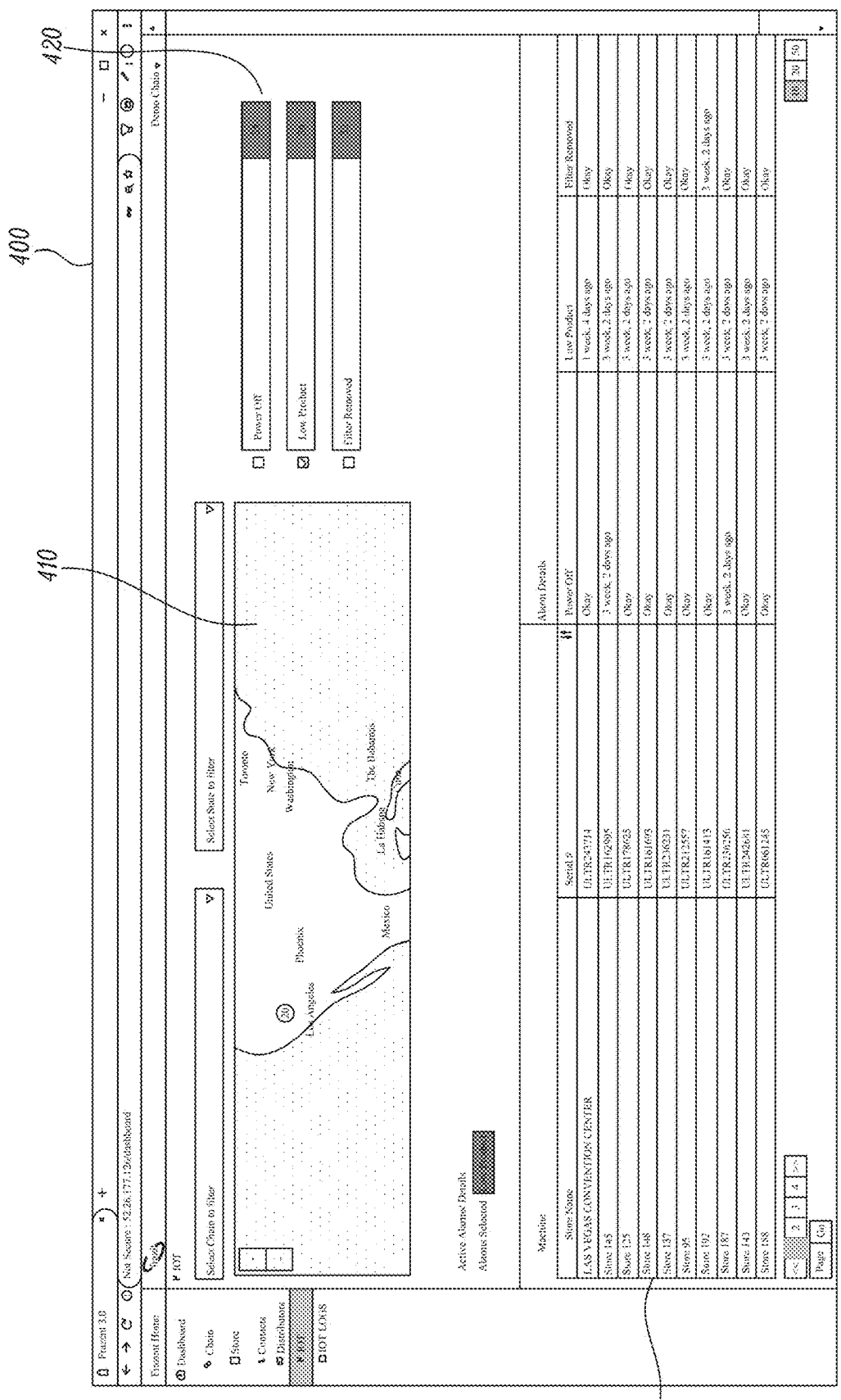
Figure 16:
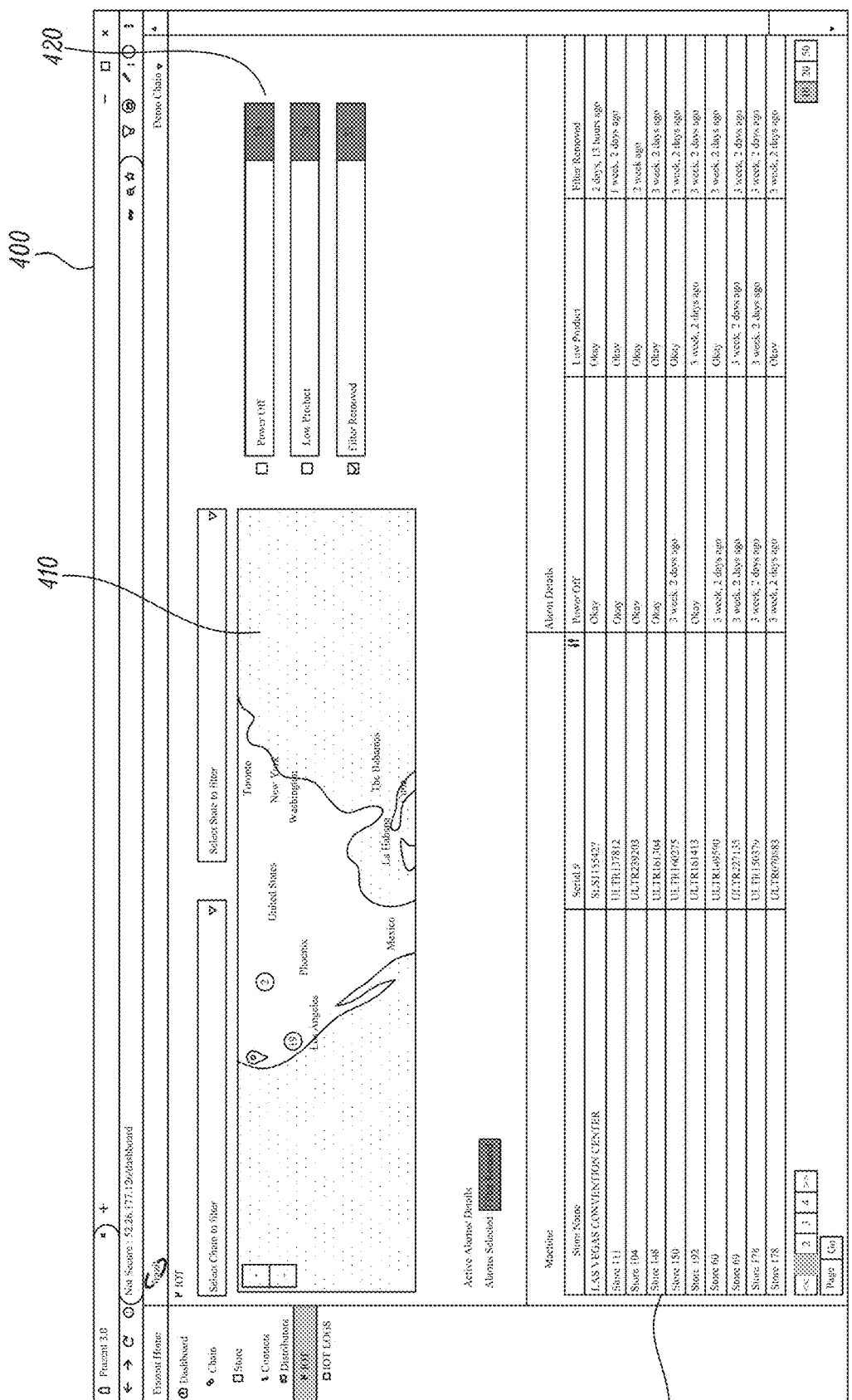
Figure 17:
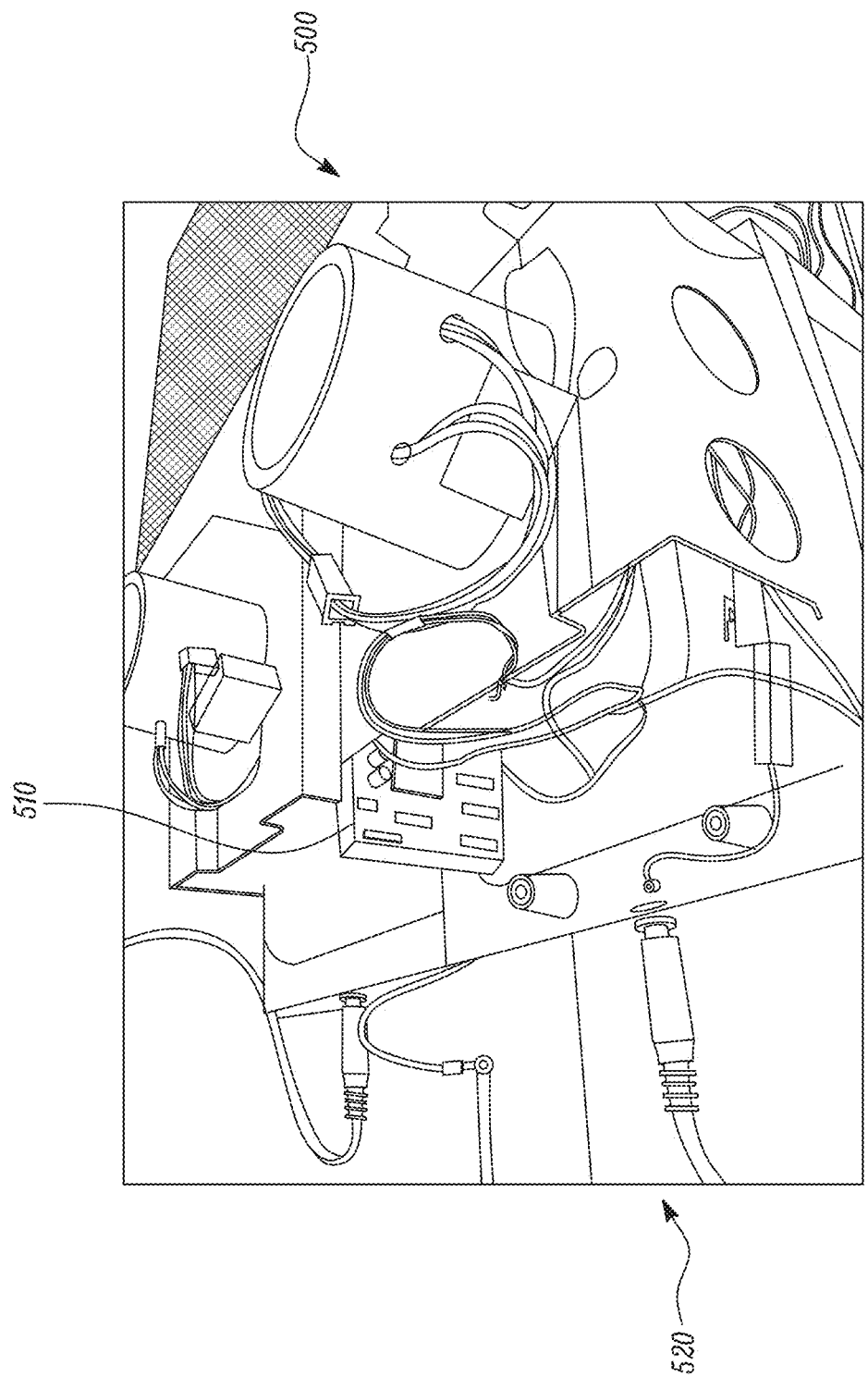
FIG. 17 is a back view of components of a connected frozen beverage machine according to aspects of the present technology.
Figure 18:
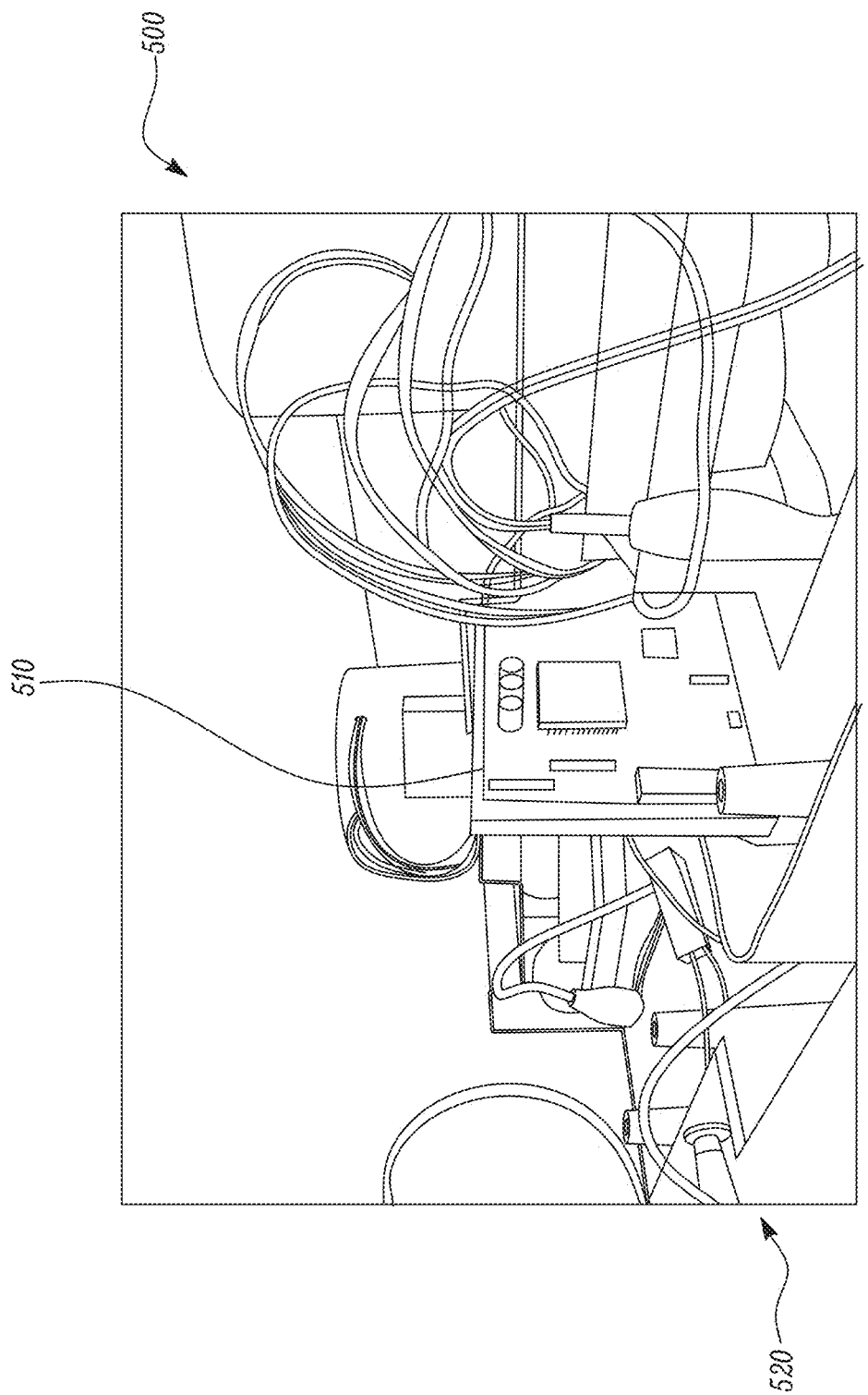
FIG. 18 is a detailed view of the connected frozen beverage machine of FIG. 13.
Figure 19:
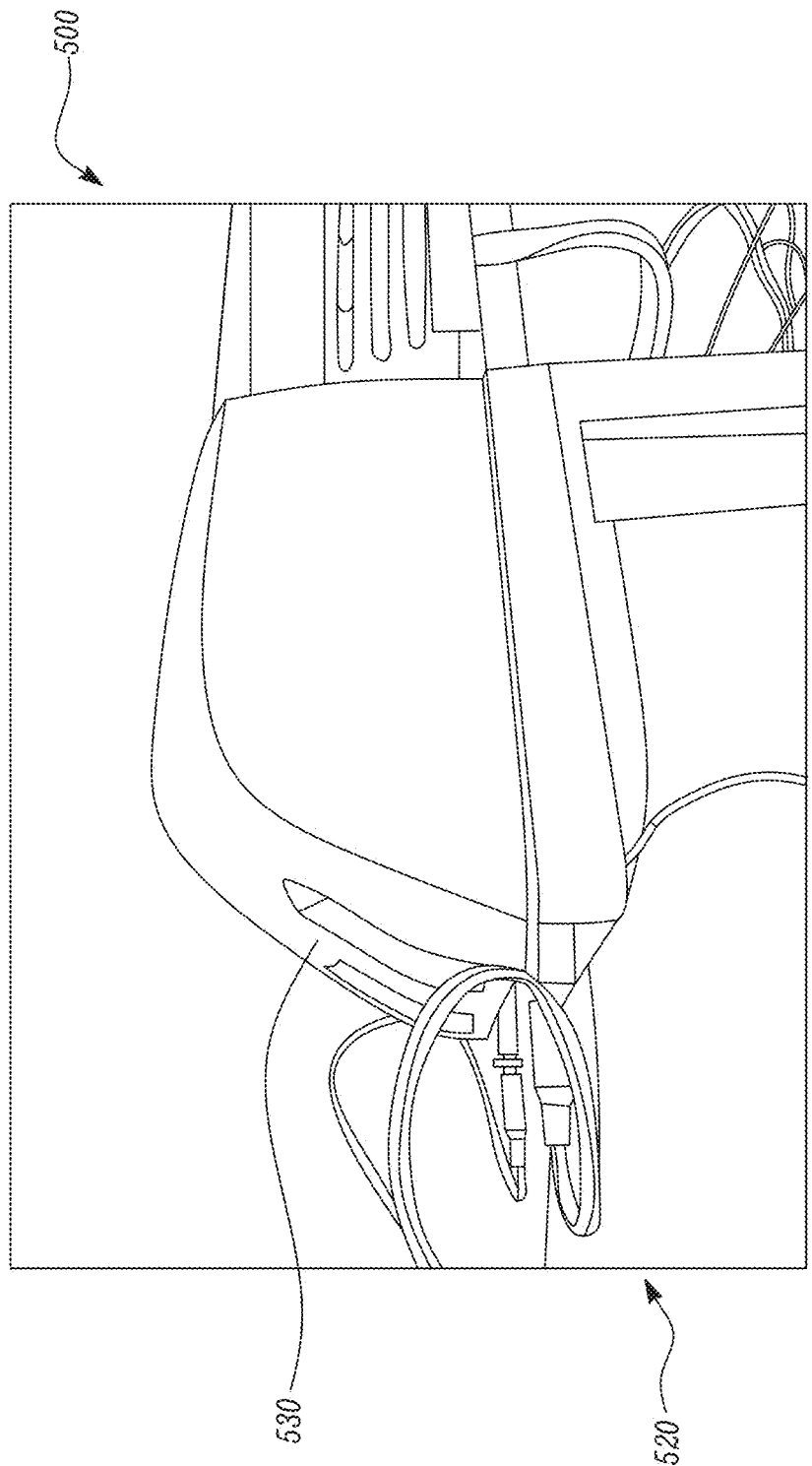
FIG. 19 is a view of the rear housing of the connected frozen beverage machine of FIG. 13.
Figure 20:
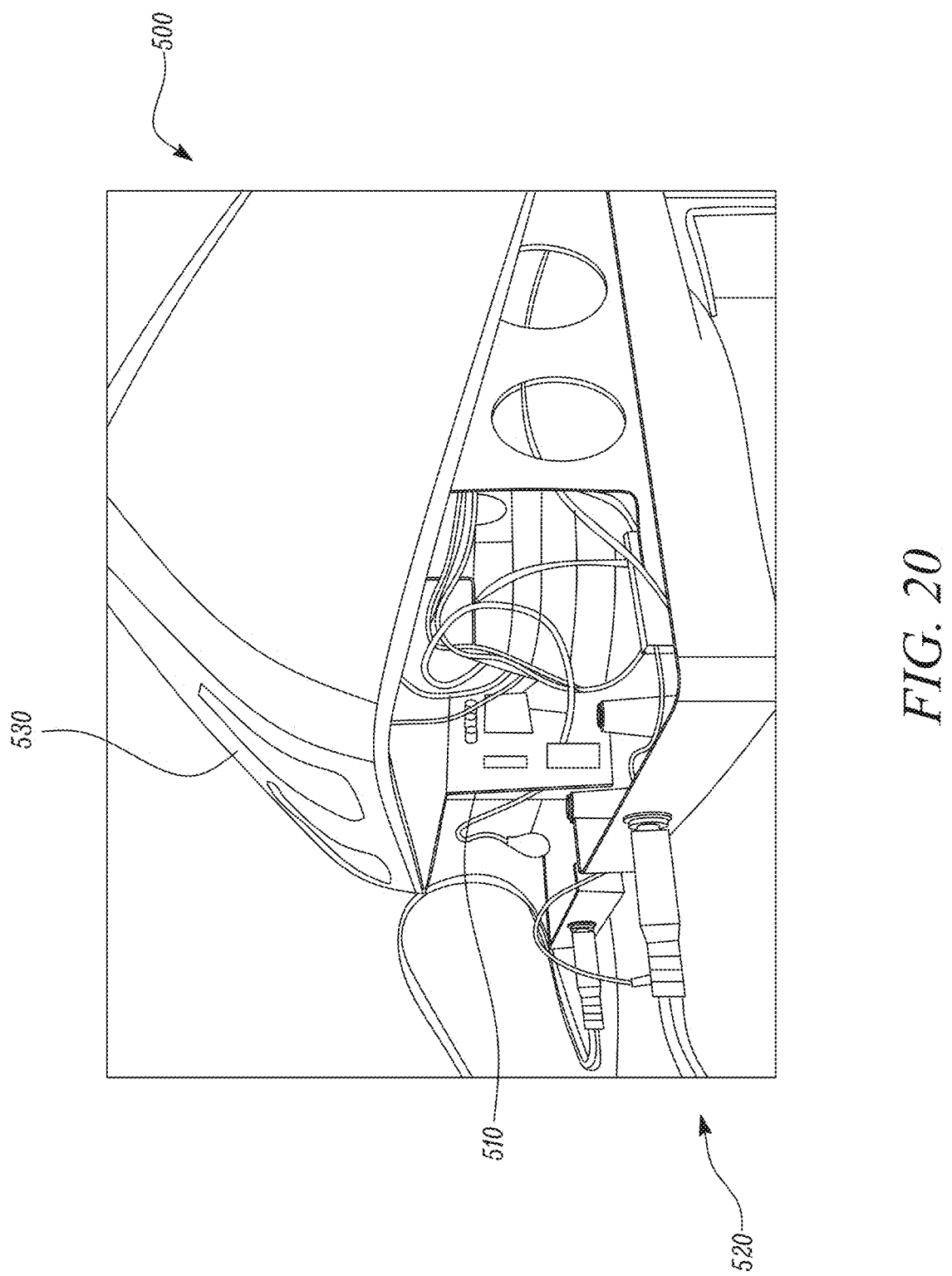
FIG. 20 is a view of the rear housing partially installed, depicting components of a connected frozen beverage machine within the housing.

FIG. 13 shows the connected machine or Internet of Things (IoT) home dashboard 400. The IoT home dashboard shows machines with an active alarm, including a map of machines with alarm 410, a filter for alarm types 420, and details 430 for the alarms. As discussed herein, an alarm may include power off, as shown in FIG. 14, low product, as shown in FIG. 15, or filter removed, as shown in FIG. 16. It will be understood by those of ordinary skill that the information displayed on the example dashboard depicted herein may be used in a variety of activities or functions, as discussed herein. Moreover, it will be understood that the system may be programed to create automatic alerts and or messages for certain events in addition to display of the data on the dashboard.

FIGS. 17-20 depict one example of components of a connected frozen beverage system 500 according to the present technology. A retrofit module 510 may be sized, dimensioned and installed within an existing channel on a frozen beverage machine 520 such that it fits securely. In some aspects of the technology, the retrofit module may be secured yet easily removable to facilitate installation and connection to the sensors. As shown, the retrofit module may be concealed below or behind existing housings 530 of the machine 520 such that the module and all other retrofit components are secure and protected during regular use of the machine 520.

With respect to each of the foregoing descriptions of the technology, the present technology may relate to either retrofitting an existing beverage machine or providing the technology herein in connection with a new beverage machine, or during production of a new beverage machine. Those of ordinary skill will understand the various applications and how they relate.

The foregoing detailed description describes the technology with reference to specific exemplary aspects. However, it will be appreciated that various modifications and changes can be made without departing from the scope of the present technology as set forth in the appended claims. The detailed description and accompanying drawings are to be regarded as merely illustrative, rather than as restrictive, and all such modifications or changes, if any, are intended to fall within the scope of the present technology as described and set forth herein.

More specifically, while illustrative exemplary aspects of the technology have been described herein, the present technology is not limited to these aspects, but includes any and all aspects having modifications, omissions, combinations (e.g., of aspects across various aspects), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims can be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus-function are expressly recited in the description herein. Accordingly, the scope of the technology should be determined solely by the appended claims and their legal equivalents, rather than by the descriptions and examples given above.

The invention claimed is:

1. A connected frozen beverage machine, comprising:
a beverage dispenser comprising at least one hopper and a cooling system comprising a hot gas line;
a plurality of sensors adapted to produce a plurality of signals including at least a power signal, low product signal when a product in the hopper is below a specified level, and cooling signal when the cooling system is running;
a retrofit module comprising a receiver for the plurality of signals and a communication component for sending the plurality of signals to a central system;
wherein a sensor on the hot gas line indicates when the cooling system is running.

2. The machine of 1, wherein the retrofit module comprises a global positioning system module.

3. The machine of claim 1, wherein the cooling system further comprises a compressor.

4. The machine of claim 1, wherein the central system monitors the plurality of signals and generates alerts based on the plurality of signals.

5. The machine of claim 4, wherein the alerts include one or more of the following: product low for longer than specified time, filter not removed for cleaning for longer than specified time, and product throughput based on cooling cycles greater than authorized product available.

6. The machine of claim 1, wherein at least one of the plurality of signals is used to estimate the amount of a product being dispensed by the beverage dispenser.

7. The machine of claim 6, wherein the amount of the product being dispensed is compared to the amount of authorized product provided to determine if unauthorized product is being dispensed by the machine.

8. A food service equipment remote monitoring system, comprising:
a plurality of food service equipment products, each comprising a cooling system comprising a hot gas line; and
a retrofit module installed in each of the plurality of food service equipment products, the retrofit module comprising a plurality of sensors adapted to produce a plurality of signals, a receiver for the plurality of signals and a communication component for sending the plurality of signals to a central system;
wherein the central system is adapted and configured to receive the plurality of signals and generate alerts based on the signals;
wherein the plurality of sensors comprises a sensor on the hot gas line.

9. The system of claim 8, wherein the central system is further adapted and configured to calculate the product throughput for one of the plurality of food service equipment products.

10. The system of claim 9, wherein the central system compares the product throughput for the food service equipment product and compares the product throughput to the amount of authorized product provided for the food service equipment.

11. The system of claim 8, wherein the plurality of food service equipment products are frozen beverage dispensers each comprising at least one hopper and a cooling system.

12. The system of claim 11, wherein the central system is adapted and configured to calculate the product throughput of a frozen beverage dispenser at a certain location and compare the throughput to quantities of authorized product sold at the location to verify that only authorized product is being used in the frozen beverage dispenser.

13. The system of claim 12, wherein the central system calculates the product throughput based on one or more signals from a cooling system.

14. The system of claim 12, wherein the central system calculates the product throughput based on one or more signals form a low product sensor.

15. A method for retrofitting and remotely monitoring food service equipment, comprising:
providing a plurality of food service equipment products,
installing a retrofit module in each of the plurality of food service equipment products, the retrofit module comprising a receiver for a plurality of signals and a communication component for sending the plurality of signals to a central system;
receiving the plurality of signals at the central system and generating alerts based on the signals;
calculating the quantity of product throughput for each of the plurality of food service equipment products and comparing the calculated quantity of product throughput to the quantity of authorized product sold to verify that only authorized product is being used in the food service equipment products.

16. The method of claim 15, wherein the food service equipment products each comprises a plurality of sensors adapted to produce the plurality of signals.

17. The method of claim 15, wherein the retrofit module comprises a plurality of sensors to be installed in each of the plurality of food service equipment products, the plurality of sensors adapted to produce the plurality of signals.

18. The method of claim 15, wherein the alert generated by the central system comprises an alert that one or more food service equipment products may be using unauthorized product.

19. The machine of claim 1, wherein the cooling system comprises a filter, and wherein a pressure sensor at the filter indicates when the filter is removed.

* * * * *